United States Patent [19]

Fragnito

[11] Patent Number: 5,413,009
[45] Date of Patent: May 9, 1995

[54] VARIABLE SPEED TRANSMISSION ASSEMBLY

[76] Inventor: Frank Fragnito, 11 Holmes Ave., North Babylon, N.Y. 11703

[21] Appl. No.: 213,680

[22] Filed: Mar. 16, 1994

[51] Int. Cl.⁶ ............................................. F16H 15/04
[52] U.S. Cl. ............................................ 74/63; 74/415
[58] Field of Search ................................... 74/63, 415

[56] References Cited

U.S. PATENT DOCUMENTS

| | | |
|---|---|---|
| 950,055 | 2/1910 | Pusterla . |
| 1,446,294 | 2/1923 | Healey . |
| 3,270,576 | 9/1966 | Goldwasser ........................ 74/191 |
| 3,906,809 | 9/1975 | Erickson ............................ 74/217 |
| 4,326,431 | 4/1982 | Stephenson ................... 74/415 X |
| 4,875,389 | 10/1989 | Fragnito ............................ 74/689 |

*Primary Examiner*—Allan D. Herrmann
*Attorney, Agent, or Firm*—Alfred M. Walker

[57] ABSTRACT

A new type of gear is provided which endorses a new type of slide pin gear having a plurality of holes within which a plurality of rounded pins travel traversely. The slide pin gear travels in combination within two corresponding exterior ruffled plates as they turn. The gear provides a positive infinitely variable speed assembly. The two wheels, each having a face of each wheel with ruffles extending from the center to peripheral edge. The ruffled surfaces are flat across the diameter, and from the center to the peripheral edge, the depth of each valley is equal to the crest of the ruffles, forming a smooth blending wave into one another. The speed radio of the gears depends upon the distance between the axle centers of the slide pin gear and the corresponding pair of ruffled wheel plates. Alternately, the gear assemblies may be provided with auxiliary locking features, to insure the locking of each of the pins at the desired position for maximum interface with the ruffled wheel plates.

16 Claims, 8 Drawing Sheets

VARIABLE SPEED TRANSMISSION ASSEMBLY

FIELD OF THE INVENTION

The present invention relates to an infinitely variable speed transmission assembly for automobiles, trucks and other machines requiring input shaft speed to be different from output shaft speed. It includes a new type of gear which encloses a rotating disc gear having a plurality of movable slide pins. The slide pins travel along the undulating surfaces of a pair of facing discs wherein the facing surfaces of the two discs are ruffled three dimensionally. The slide pins also separately traverse the surface of the disc gear within corresponding throughholes. The direction of travel of the slide pins is perpendicular to the flat plane of the rotating disc gear, which travels within the pair of ruffled facing disc wheels, so as to travel in combination as the disc wheels turn.

BACKGROUND OF THE INVENTION

The present invention is related to machine elements and transmission systems in general, and more particularly to variable speed changing systems, as classified in Class 74, subclass 689.

Other devices which concern variable gear systems include U.S. Pat. No. 950,055 of A. Pusterla, U.S. Pat. No. 1,466,294 of F. Healey, U.S. Pat. No. 3,270,576 of D. Goldwasser, U.S. Pat. No. 3,906,809 of M. Erickson and U.S. Pat. No. 4,875,389 of Frank Fragnito.

However, none of these devices disclose an infinitely variable speed transmission gear with a plurality of slide pins movable within a pair of ruffled wheels facing each other.

SUMMARY OF THE INVENTION

The present invention includes a pair of facing ruffled wheel disc plates so made that they enclose a new type of slide pin gear between the two ruffled wheel disc plates to travel in combination as the wheel plates turn, in a positive infinitely variable speed assembly.

The gear assembly includes the two wheel disc plates, with a face of each wheel disc having undulating ruffles extending from the center of the wheel to a peripheral edge. The ruffled surfaces are flat across the diameter edge of the wheels. From the center to the peripheral edge, the depth of each valley of each ruffle is equal to, and the same as the crest of the wheel disc plate ruffles, thus forming a plurality of smooth blending waves which blend into one another.

Each of the wheel plates of the ruffled wheels are a mirror image of one another. When placed together, the ruffles that face each other are made so that the crest of one side faces the valley of the other side.

The ruffled wheel plates are set in place at a predetermined distance from each other, just enough as to allow the width of the moveable slide pin gear, without the slide pins, to pass through the crests of both of the ruffled wheel plates, and so are set at that position on a rotating shaft.

The plurality of slide pins move in axially parallel directions, within the slide holes of the slide pin gear, and the pins are movable between the valleys and crests of the ruffled wheel plates that are facing each other, as the pins are longer then the width of the slide pin gear between its two opposite circular flat surfaces.

The slide pin gear has equally spaced holes placed close to the outer peripheral edge of the slide pin gear, enough as to support each hole that allows each corresponding slide pin to go from side to side while each pin traverses through the width of the slide pin gear.

The lengths of each of the rounded convex ended slide pins is equal to the distance between each corresponding crest and valley of the ruffle wheel plates that face each other, so that the slide pins tangentially move across the surface of each of the ruffled wheel plates.

Different sections of the convex edge of each of the slide pins come in contact with each of the surfaces of the valleys and crests of the ruffled wheel plates.

The slide pin or pins which are in the straightest line with the axle centers of the ruffled wheel plates gear and mating slide pin gear act in combination in this assembly, and when the slide pins are at the zenith of their respective turning radii, the slide pins offer their most support to one another, to blend into the force of their turning actions. The slide pins are locked secured within the valleys of each ruffled wheel plate by the corresponding crest of the opposite ruffled wheel plate.

When in motion, the incoming slide pins and the outgoing slide pins move from side to side in the slide area in which the pins are located in, because of the sideward thrust that is imposed on each slide pin by the sine of the angle of the crest of the corresponding ruffled wheel plate, as the crest of the corresponding wheel plate pushes the slide pin into the corresponding valley of the opposite ruffled wheel plate.

The same occurs as the pins leave, and the slide pins only come to their locked secured position in the slide pin gear as they reach the zenith of each radii of each turn, as the slide pins are trapped in the valleys of the ruffled wheel plates by the crests of the other ruffled wheel plate. In this position the ruffled wheel plates are in their mode turning together, and either one can be the drive or driven portion of the gear.

The slide pin gear can be put in any radius of the ruffled wheel plates, and thus changing the speed of the shafts of either of the slide pin gear or of the ruffle gear, whichever is the drive or driven, and in this manner a positive infinitely variable speed between two shafts is obtained by the ruffled gear assembly of the present invention.

The assembly can be put into different stages of the variable speed mode at a stop mode or a power mode.

OBJECTS OF THE INVENTION

It is an object of the present invention to provide a new type of gear so made that it will enclose a new type of slide pin gear to travel in combination within a pair of facing ruffled wheel plates.

It is a further object of the present invention to provide a positive infinitely variable speed assembly gear.

It is a further invention to provide a gear with wheel plates having ruffles from the center to peripheral edge.

It is a further object of the present invention to provide a gear with a pair of ruffled wheel plates being a mirror image of one another.

It is a further object to provide a pair of ruffled gear wheel plates that face each other so that the crest of one ruffled wheel plate faces the valley of the other ruffled wheel plate.

It is a further object to provide a gear with movable pins movable between a pair of facing ruffled wheel plates, with a slide pin gear movable between the crests of both of the ruffled wheel plates.

It is a further object to provide a slide pin gear with equally spaced holes close to outer peripheral edge of the slide pin gear to allow a plurality of slide pins to go from side to side within the equally spaced holes.

It is a further object to provide a gear assembly with movable pins that are in the straightest line with the axle centers of the ruffled wheel plates and mating slide pin gear that are in combination in the assembly. It is a further object of the present invention to provide a plurality of movable slide pins which offer support to one another, to blend in to the force of their turning action.

It is a further object to provide a gear with movable incoming pins and outgoing pins which move from side to side in their slide area that they are in because of the sideward thrust that is imposed on the pins by the sine of the angle of the crests of each of the ruffled wheel plates pushing each pin into the valley of an opposite corresponding ruffled wheel plate.

It is yet another object to provide a gear wherein as the slide pins move, the pins only come to a locked secure position in the slide pin gear as each of the slide pins reaches its zenith of the radius of its turn, as each pin is held trapped in a valley of one ruffled wheel plate by the crest of another corresponding wheel plate.

It is yet a further object to provide a ruffled gear which can change the speed of a plurality of gear shafts.

It is a further object to provide a gear assembly which can be put into different stages of a variable speed mode at either a stop mode or a power mode.

It is yet another object to improve over the disadvantages of the prior art.

DETAILED DESCRIPTION OF THE PREFERRED EMBODIMENT

As shown in FIGS. 1, 2, 4 and 5, there is depicted an infinitely variable speed transmission assembly gear for automobiles, trucks and other machines requiring an input shaft speed to be different from an output shaft speed. The present invention includes a type of gear 1 which encloses a rotating slide pin gear 2 which rotates with its shaft 9 having a plurality of movable slide pins 3, 3a, 3b, etc. Slide pins 3, 3a, 3b, etc. travel along the undulating surfaces 4a and 5a of a pair of facing disc wheel plates 4 and 5 wherein the facing surfaces 4a and 5a of the two disc wheel plates 4 and 5 are ruffled three dimensionally.

Slide pins 3, 3a, 3b, etc. also separately traverse the surface of disc gear 2 within corresponding throughholes 6, 6a, 6b, etc. The direction of travel of slide pins 3, 3a, 3b is perpendicular to the flat plane surfaces 7 and 8 of rotating disc gear 2, which gear 2 travels between the pair of ruffled surfaces 4a and 4b of facing disc wheel plates 4 and 5, so as to travel in combination as disc wheel plates 4 and 5 turn in unison with corresponding shaft 10.

FIGS. 1, 2 and 4–5 show two wheels disc plates 4 and 5 each with the faces 4a and 5a of each wheel disc plate having ruffles 11, 12 extending radially from the centers 13, 14 of each plate 4, 5 to corresponding peripheral edges 15, 16 of corresponding wheel plates 4 and 5. Ruffled surfaces 4a, 5a are flat across the diameter of each plate, and extend from the centers 13, 14 to the peripheral edges 15, 16. The depth of each valley 11a or 12a of each ruffle 11 or 12 on each wheel disc 4, 5 plate is equal to crest 11b or 12b of each of ruffles 11, 12 on the other corresponding wheel disc plate 4 or 5, so that together ruffles 11, 12 are all equal, forming a smooth blending wave as ruffles 11, 12 blend into one another.

Figure 1:
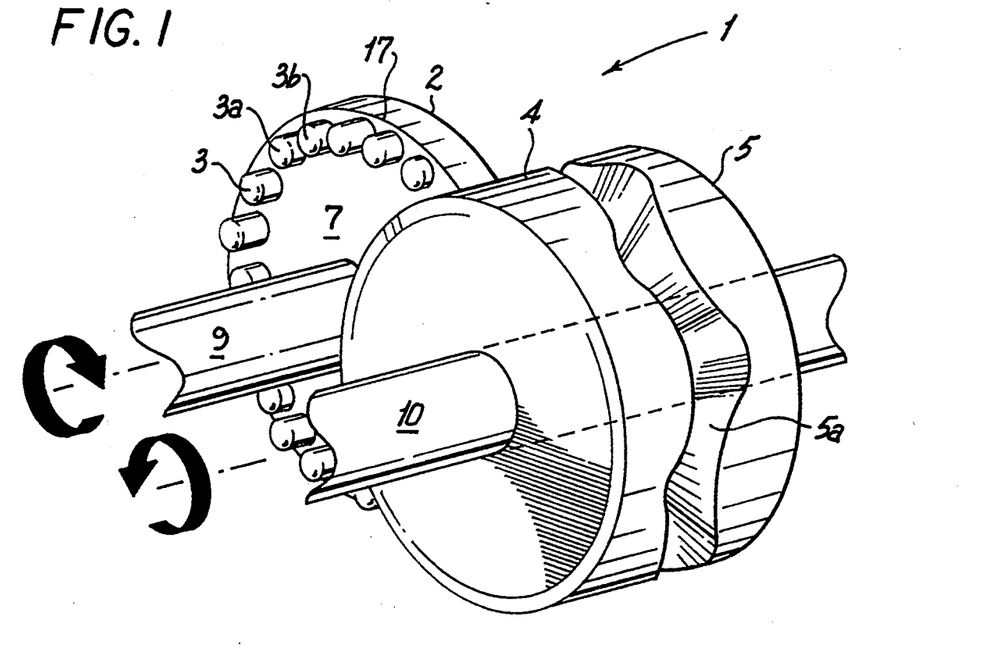
FIG. 1 is an overall perspective view of a gear with a pair of corresponding facing twin ruffled disc wheel plates sandwiching a slide pin gear therebetween, with arrows indicating axial rotation of each of the shafts of the slide pin gear and the corresponding facing ruffled disc wheel plates.

FIG. 1 is an overall perspective view of twin ruffled wheel disc plates 4 and 5 sandwiching therebetween slide pin gear 2, with arrows indicating axial rotation of axle shaft 9 of inner slide pin gear 2 and axle shaft 10 of outer ruffled disc wheel plates 4 and 5.

Figure 2:
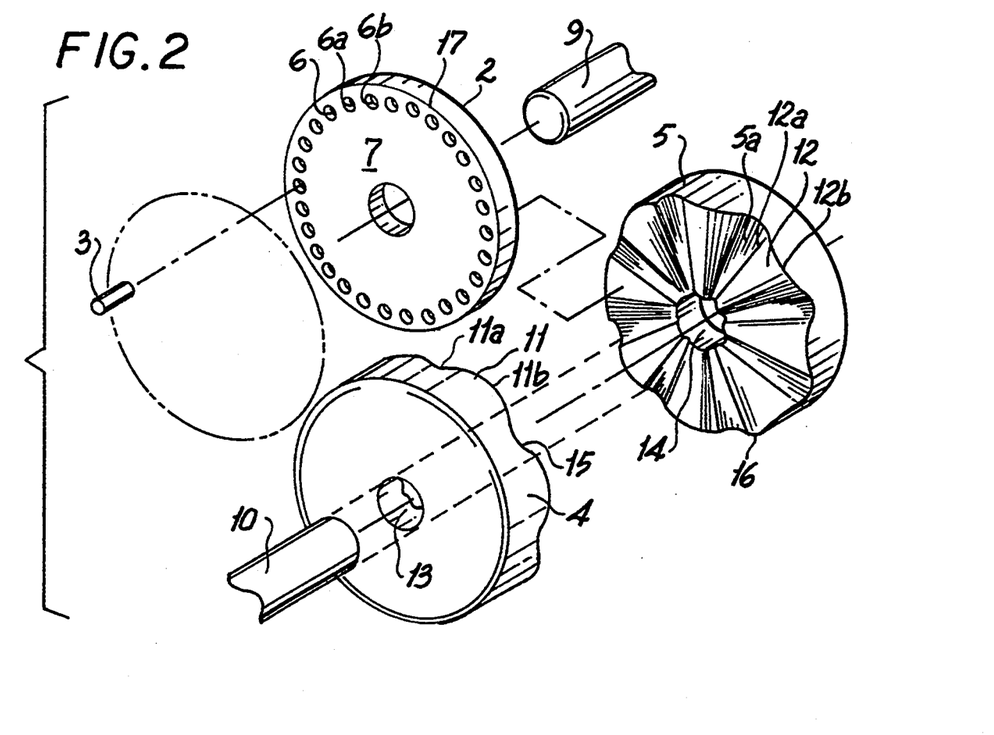
FIG. 2 is an exploded view of the parts of the gear as in FIG. 1.

FIG. 2 is an exploded view of the parts of the above embodiment showing individually two outer ruffled wheel disc plates 4 and 5 and with its shaft 10 upon which two outer disc plates 4 and 5, rotate, as well as inner slide pin gear 2 and its shaft 9 with its peripheral transverse holes 6, 6a, 6b, etc. together with a typical slide pin 3 and axle shaft 9 with which slide pin gear 2 rotates.

Figure 3:
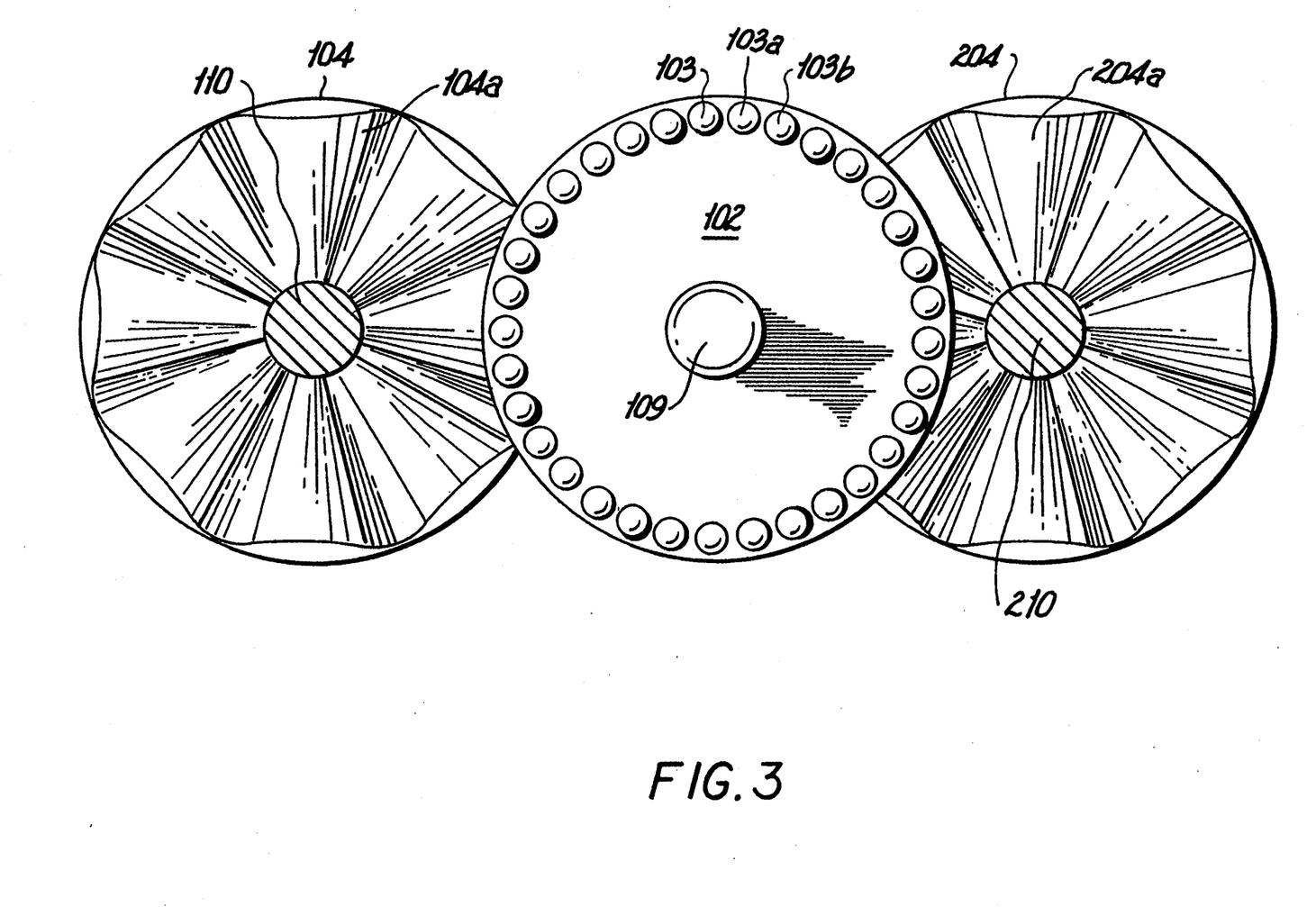
FIG. 3 is a sectional side elevation view of an alternate embodiment of a gear, showing two outer ruffled wheel plates removed to reveal corresponding inner gear surfaces and differing proximities to a slide pin gear, which effects rotation of the corresponding ruffled wheel plates.

FIG. 3 shows a sectional elevation view of an alternate embodiment wherein slide pin gear 102 with shaft 109 and pins 103, 103a, 103b, etc. travels laterally between two laterally opposed pairs of ruffled plates rotating about respective shafts 110 and 210. FIG. 3 also shows two outer ruffled gear disc plates removed to reveal inner gear surfaces 104a and 204a of wheel plates 104 and 204 and differing proximities to slide pin gear 102, which effects rotation of each of the pairs of ruffled plates within which slide pin gear 102 moves.

Figure 4:
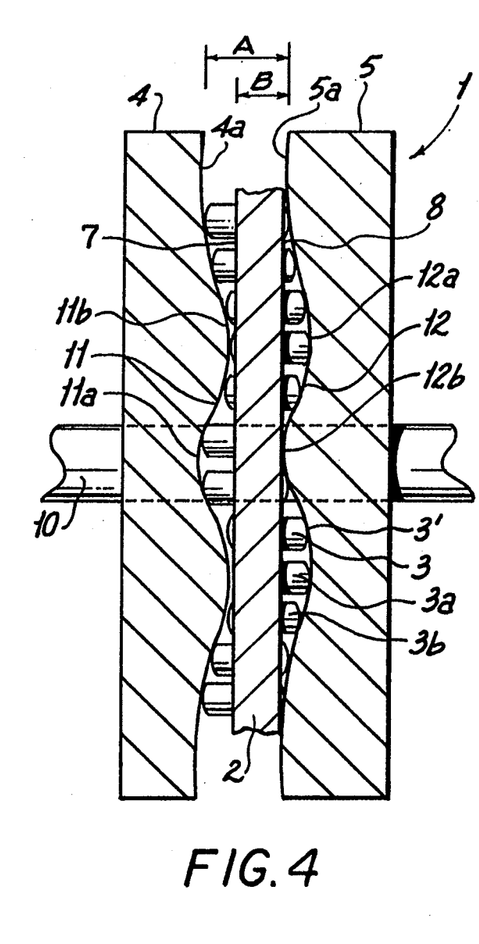
FIG. 4 is a sectional end view of ruffled gear's action on slide pins located close to drive shaft of ruffled wheel plates of the gear as in FIG. 1.

FIG. 4 is a sectional end view showing the two ruffled gear disc plate's action on the convex ends of slide pins 3, 3a, 3b, etc. located close to drive shaft 10 of ruffled disc plates 4 and 5.

Figure 5:
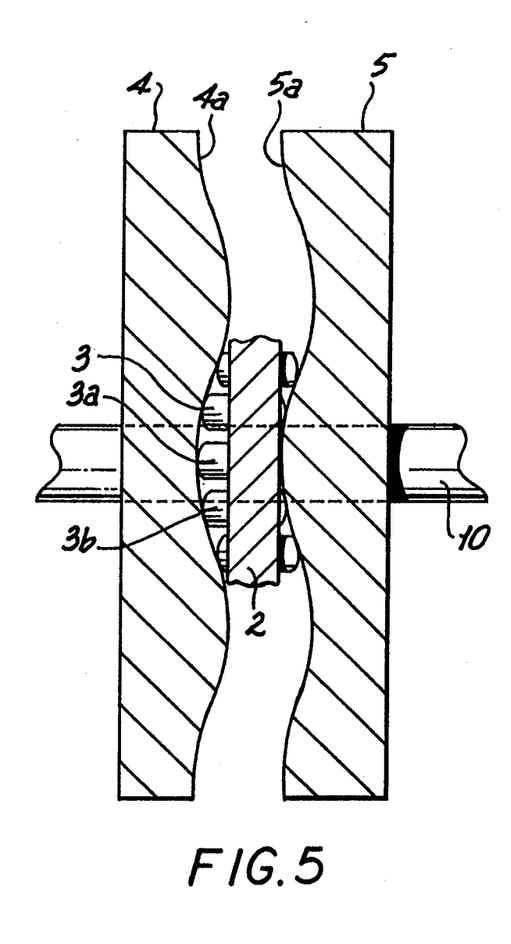
FIG. 5 is a sectional end view of ruffled gear's action on slide pin located toward edges of ruffled wheel plates of the gear as in FIG. 1.

FIG. 5 is a sectional end view of the action of ruffled gear disc plates 4 and 5 action on slide pins 3, 3a, 3b, etc. when located toward the peripheral edges of ruffled gear disc plates 4 and 5.

FIG. 4 and 5 show both ruffled disc wheel plates 4 and 5 being a mirror image of one another, and that ruffled surfaces 11, 12 of disc wheel plates 4, 5 which face each other are made so that the crest, such as crest 11b, of one side faces the valley, such as valley 12a, of the other.

FIG. 4 also shows that ruffled surfaces 11, 12 are set at a predetermined distance A from each other, just enough as to allow the width B of inner slide pin gear 2, without slide pins 3, 3a, 3b, etc., to pass through crests 11b, 12b, of both of ruffled disc plates 4, 5, and so are set at that position on its shaft 10. That one end of slide pin is in a valley of one of the ruffled plates and the other end of the slide pin is on a crest on the other ruffled plate.

As further shown in FIG. 4, slide pins 3, 3a, 3b, etc. traverse peripheral holes 6, 6a, 6b, of slide pin gear 2, and pins 3, 3a, 3b, etc. are sandwiched between the valleys and crests of ruffled wheel plates 4, 5 that are facing each other, as pins 3, 3a, 3b, etc. extend longitudinally longer then the width B of slide pin gear 2.

As also shown in FIGS. 1 and 2, slide pin gear 2 has equal spaced holes 6, 6a, 6b, etc. close to outer peripheral edge 17 of slide pin gear 2. Slide pin gear 2 supports the respective holes 6, 6a, 6b, etc. that allow slide pins 3, 3a, 3b, etc. to go from side to side in a direction perpendicular to the plane of slide pin gear 2, as also is shown in FIG. 4.

As further shown in FIG. 4, the longitudinal length of each of rounded ended pins 3, 3a, 3b, etc. is equal to the distance A between each of the crests and valleys of each of the surfaces of ruffled wheel plates 4 and 5 that face each other.

As shown in FIGS. 4 and 5, a different section of the convex outer end hemisphere of each of slide pins 3, 3a, 3b, etc. comes in contact with the surfaces of the valleys and crests of ruffled disc plates 4 and 5, as each of pins 3, 3a, 3b, etc. traverse ruffled surfaces 11 and 12 of ruffled wheel plates 4 and 5.

The pin or pins that are in the straightest line with axle centers of ruffled wheel plates 4 and 5 and mating slide pin gear 2 are at their zenith of their turning radius, and about this point is where they offer their most support to one another, to blend in to the force of their turning action. FIGS. 4 and 5 also show how each pin 3, 3a, 3b, etc. is locked in the valley of one ruffle plate 5 by the crest of opposite ruffle plate 4, as pins 3, 3a, 3b, etc. travel together.

Figure 6:
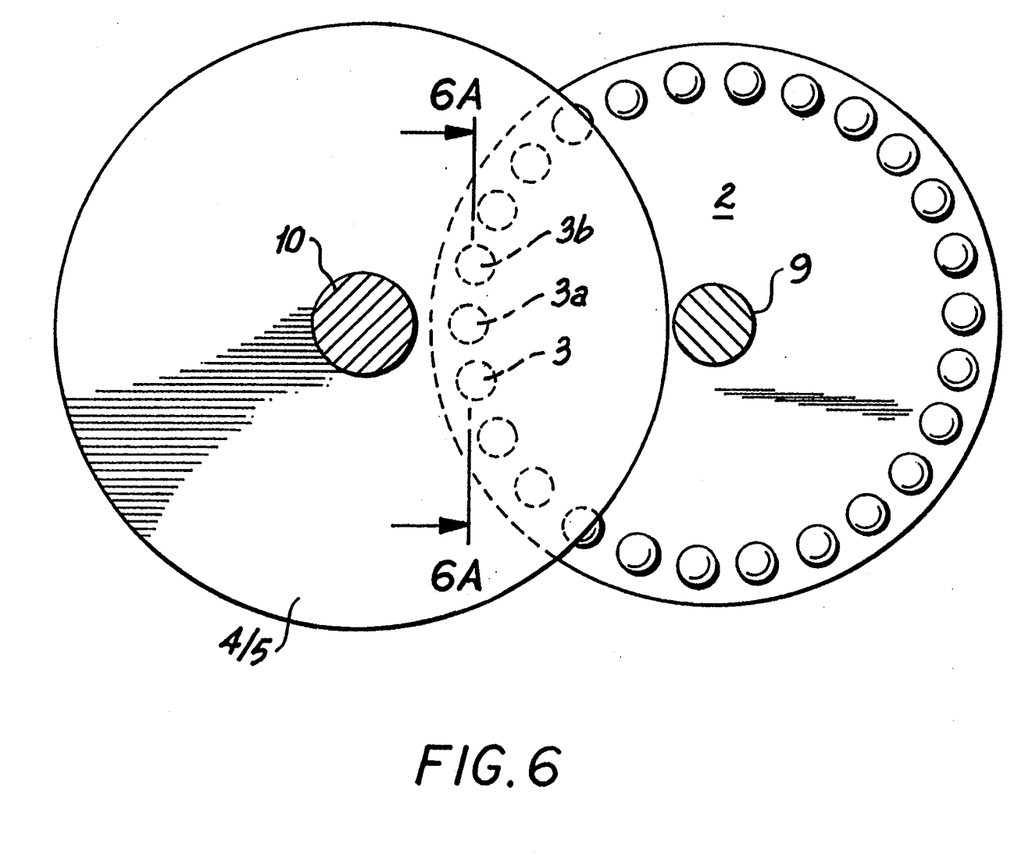
FIG. 6 is a partial cut away elevational view of the slide pin gear within two ruffled gears.
Figure 6A:
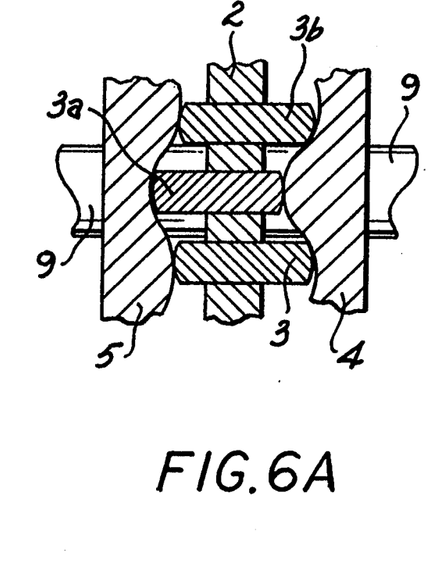
FIG. 6A is a sectional elevational view taken along line 6A in FIG. 6.

FIGS. 6 and 6A show how the incoming pins and the outgoing pins moves from side to side in the sliding area that they are in, because of the sideward thrust that is imposed on each pin by the sine of the angle of each of the crests of ruffle plate 4, pushing each of the pins 3, 3a, 3b, etc. into the respective valleys of the opposite plate 5.

The same pushing action occurs as the pins 3, 3a, 3b, etc. leave, and the pins 3, 3a, 3b, etc. only come to their locked secure position within slide pin gear 2 as they reach the zenith of the radius of their turn, as pins 3, 3a, 3b, etc. are trapped in the respective valleys of ruffled wheel plate 4 by the crests of other ruffled wheel plate 5, and in this position pins 3, 3a, 3b, etc. turn together. Either one can be the driver or the driven.

As shown in FIG. 1, the gear ratio is changed by altering the distance between shafts 9 and 10 so that the peripheral edge 17 of slide pin gear 2 is alternately closer or farther from the axle center of ruffled wheel plates 4 and 5.

When inserted deeper within ruffled wheel plates 4 and 5, more pins 3, 3a, 3b etc. are exposed to surfaces 4a and 5a of wheel plates 4 and 5. Therefore, if slide pin gear 2 is the driver, it will use ruffled plates 4 and 5 to go faster than if slide pin gear 2 is farther away, and less pins 3, 3a, 3b etc. are exposed to ruffled surfaces 4a and 5a, making a slower motion of ruffled wheel plates 4 and 5.

As is shown in the .embodiment of FIG. 3, slide pin gear 102 can be put in any position within ruffled wheel plates and thus can change the speed of shafts 109, 110 and 210, either of slide pin gear 102, or of the pairs of ruffled wheel plates, whichever is the drive or driven. In this manner is how a positive infinity variable speed between a plurality of shafts is obtained by the ruffled gear assembly.

Figure 7:
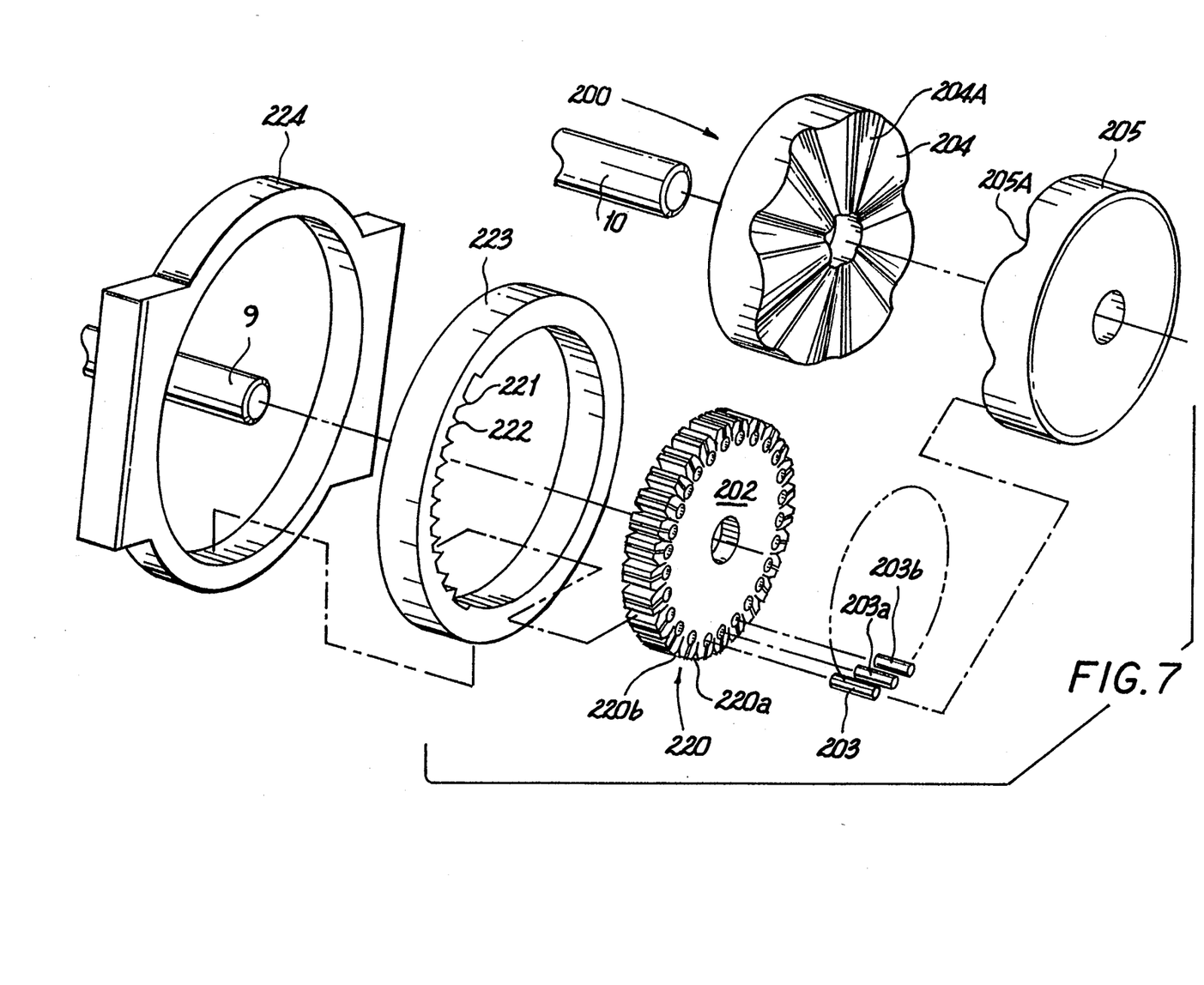
FIG. 7 is an exploded perspective view of an alternate embodiment comprising a timing gear.
Figure 7A:
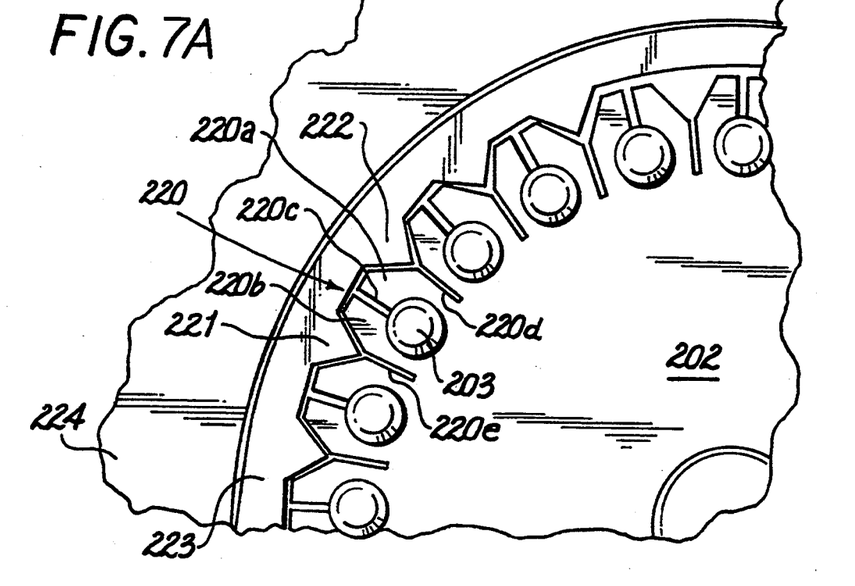

As shown in FIGS. 7 and 7A, an alternate embodiment includes pin gear 202 which rotates with its shaft 9. Slide pins 203, 203a, 203b, etc. travel along undulating surfaces 204a and 205a of facing disc wheel plates 204 and 205, which are ruffled three dimensionally. Undulating surfaces 204a and 205a on the ruffled plates are rounded at the periphery for ease of entrance of pins 203, 203a, 203b, etc.

To facilitate locking of pins 203, 203a, 203b, etc., pins 203, 203a, 203b, etc., are enclosed within a coupling 220. Each coupling 220 has a pair of spring walls 220a, 220b, which walls 220a, 220b squeeze together between adjacent teeth 221, 222 of outer gear 223.

Spring walls 220a, 220b compress against each other, thereby locking pin 203 in place when pin 203 is at a predetermined position located along the periphery of slide pin gear 202, corresponding to the zenith of rotation of slide pin gear 202, when the zenith of rotation is closest to the axle centers of ruffled wheel plates 204, 205.

Figure 8:
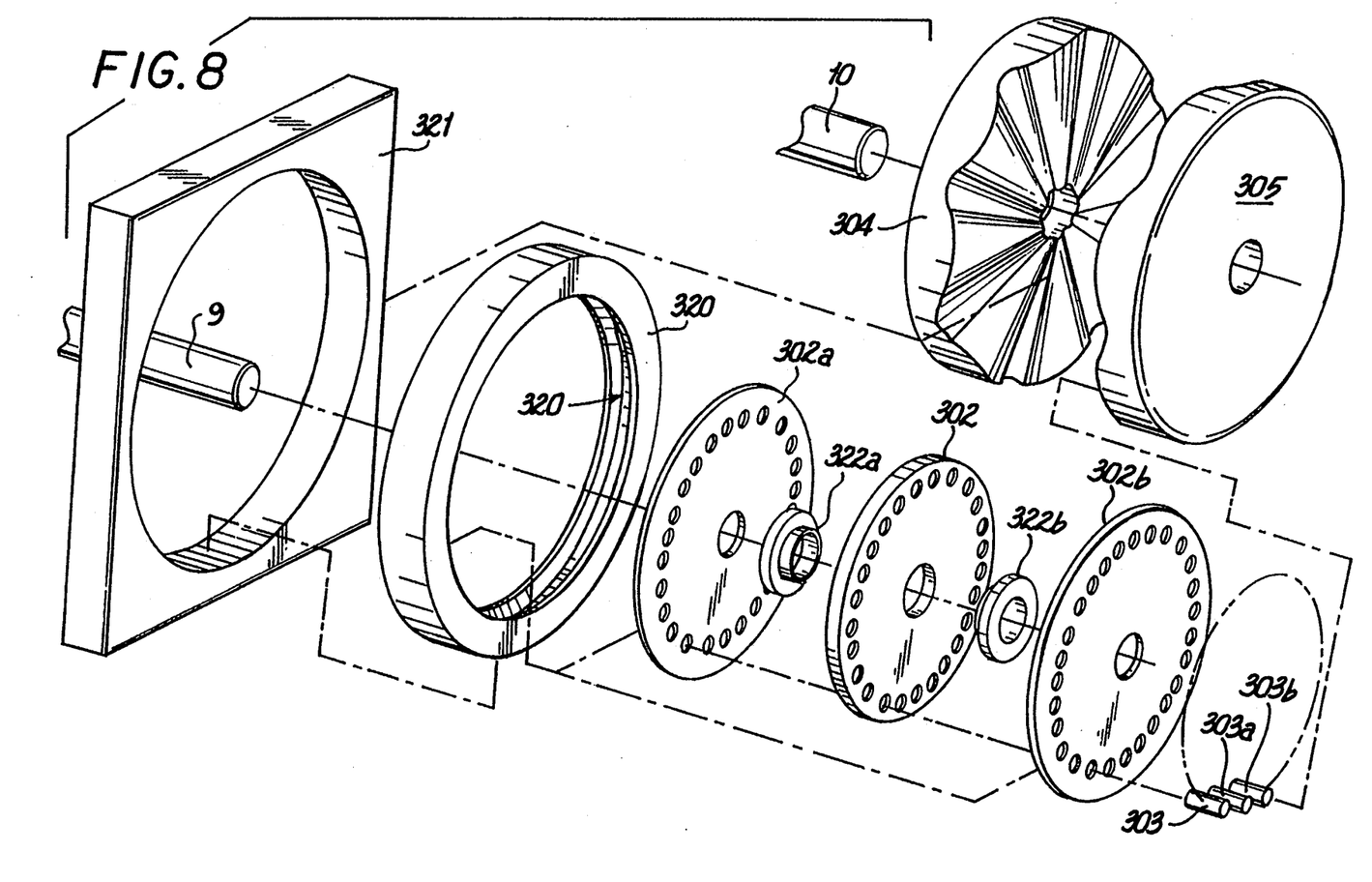
FIG. 8 is an exploded perspective view of a further alternate embodiment comprising a slide pin gear composed of three steel plates.
Figure 9:
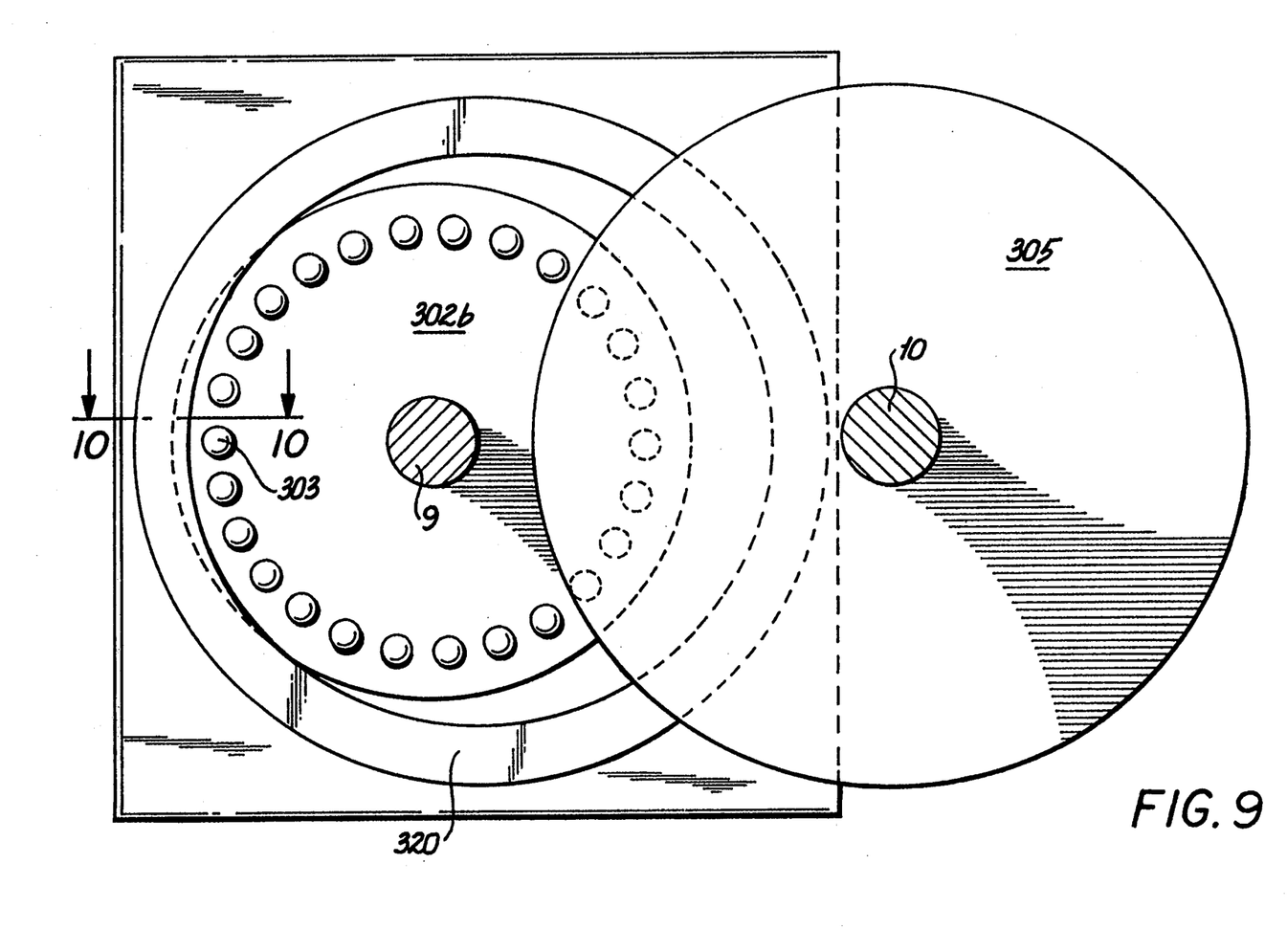
FIG. 9 is an elevational view of the assembled components of FIG. 8.
Figure 10:
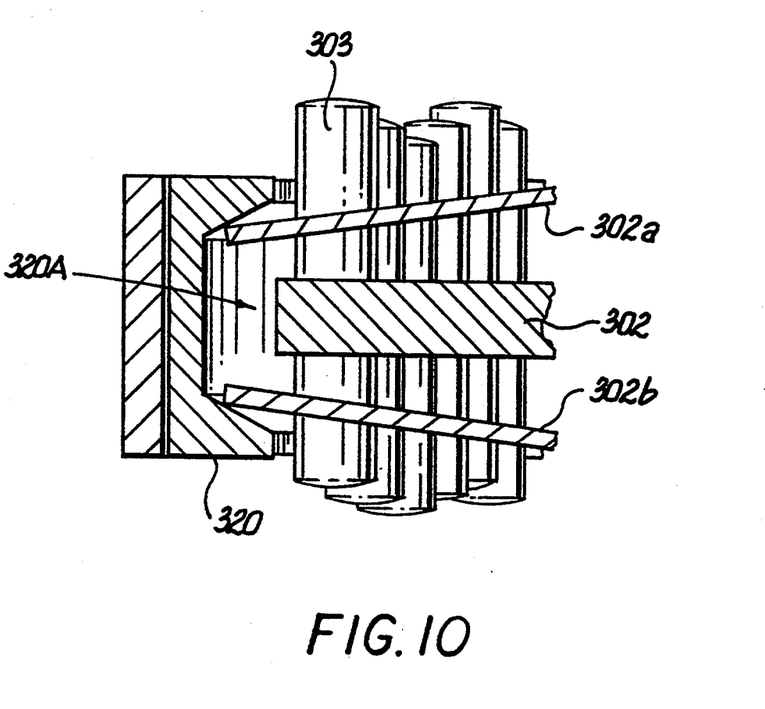
FIG. 10 is a sectional plan view taken along lines 10—10 of FIG. 9.

In an alternate locking embodiment shown in FIGS. 8–10, slide pin gear 302 is between a pair of spring type outer disc plates 302a and 302b, which plates 302a, 302b compress within locking ring 320, as shown in FIG. 9, thus locking pins 303, 303a, 303b, etc., in place, as pins 303, 303a, 303b etc. are at a predetermined position located along the periphery of slide pin gear 302 at a point corresponding to the zenith of rotation of slide pin gear 302, when the zenith of rotation is closest to the axle centers of ruffled wheel plates 304, 305.

OPERATION OF THE PRESENT INVENTION

As shown in the embodiment described in FIGS. 1–6A, the speed transmission gear assembly of the present invention includes a pair of facing ruffled wheels 4, 5 so made that ruffled plates 4, 5 sandwich therebetween a new type of slide pin gear 2 to travel in combination as the wheel plates 4, 5 turn, in a positive infinitely variable speed assembly.

The gear assembly 1 includes two wheel plates 4, 5 with a face of each wheel plate 4, 5 having undulating ruffles 11, 12 extending from the centers 13, 14 of wheel plates 4, 5 to a peripheral edges 15, 16. Ruffled surfaces 11, 12 are flat across the diameter of ruffled wheel plates 4, 5. From the center to peripheral edges 15, 16, the depth of each valley of each ruffle is equal to and the same as the crest of ruffles 11, 12, thus forming a plurality of smooth blending waves which blend into one another.

Each of the surface plates of ruffled wheel plates 4, 5 are a mirror image of one another. When placed together, ruffles 11, 12 that face each other are made so that the crest of one side faces the valley of the other side.

Ruffles 11, 12 are set in place at a pre-determined distance A from each other, just enough as to allow the width B of slide pin gear 2, without the slide pins 3, 3a, 3b, etc., to pass through the crests of both of the ruffle plates 4 and 5, and so are set at that position on its shaft 10.

Slide pins 3, 3a, 3b, etc. move within slide holes 6, 6a, 6b, etc. of slide pin gear 2, and pins 3, 3a, 3b, etc. are movable between the valleys and crests of ruffled wheel plates 4, 5 that are facing each other, as pins 3, 3a, 3b, etc. are longer then the width B of slide pin gear 2.

Slide pin gear 2 has equally spaced holes 6, 6a, 6b, placed close to the outer peripheral edge 17 of slide pin gear 2, enough as to support each hole 6 that allows each corresponding slide pin 3 to go from side to side.

The lengths of convex, rounded ended slide pins 3, 3a, 3b, etc. are equal to the distance between the crest and valley of ruffled wheel plates 4, 5 that face each other.

Different sections of the edge 3¹ of slide pins 3, 3a, 3b, etc. come in contact with the surfaces of the valleys and crests of ruffled wheel plates 4, 5.

Slide pins 3, 3a, 3b, etc. which are in the straightest line with axle centers of ruffled wheel plates 4, 5 and mating slide pin gear 2 act in combination in gear assembly 1, and when slide pins 3, 3a, 3b, etc. are at the zenith of their respective turning radii, slide pins 3, 3a, 3b, etc. offer the most support to one another, to blend into the force of their turning action. Slide pins 3, 3a, 3b, etc. are locked secure in the valleys of each ruffled wheel plate 4 by the crest of opposite ruffle plate 5.

When in motion, incoming slide pins 3, 3a, 3b, etc. and outgoing slide pins 3, 3a, 3b, etc. move from side to side in the slide area in which pins 3, 3a, 3b, etc. are located in, because of the sideward thrust that is imposed on each slide pin 3 by the sine of the angle of the crest of ruffled wheel plate 4 which pushes each slide pin 3 into the valley of opposite ruffled plate 5. The same occurs as pin 3 leaves, and slide pins 3, 3a, 3b, etc. only come to their locked position in slide pin gear 2 as they reach the zenith of each radii of each turn, as slide pins 3, 3a, 3b, etc. are trapped in the valleys of the ruffles by the crests of the other respective plate 4 or 5.

In this position ruffled wheel plates 4, 5 are in their mode turning together and either one can be the drive or driven portion of gear assembly 1.

Slide pin gear 2 can be put in any radius of ruffled wheel plates 4, 5 and thus changing the speed of shaft 9 of either of slide pin gear 2 or of shaft 10 of the ruffled wheel plate, whichever is the drive or driven. In this manner a positive infinitely variable speed between the two shafts 9, 10 is obtained by the ruffled gear assembly 1 of the present invention.

The gear assembly 1 can be put into different stages of the variable speed mode at a stop mode or a power mode.

As is also shown in two alternate embodiments described in a FIGS. 7–10, it is preferable to lock the pins in place within the slide pin gear, as the pins in the pin gear are placed into position by the action of the ruffled gear plates on the pins.

In one locking embodiment shown in FIGS. 7 and 7A, pin gear 202 has arrangement of holes around the peripheral edge within which hole pins 203, 203a, 203b, etc., traverse slide pin gear 202. However, unlike the embodiment shown in FIGS. 1–5, in this alternate embodiment, pins 203, 203a, 203b, etc., are surrounded by coupling 220.

Coupling 220 includes a pair of spring walls 220a, 220b, which are squeezed together between adjacent teeth 221, 222. Spring walls 220a and 220b are surrounded by a first slit 220c, which is made from the edge of slide pin gear 202 to the holes.

Further slits 220d and 220e are made as second and third slits on both side of each of the holes, to a predetermined depth, to surround each pin 203, 203a, 203b, etc. with a pair of surrounding spring walls 220a, 220b, etc. Spring walls 220a, 220b, etc. compress against each other to tighten each each of pins 203, 203a, 203b, etc., within the respective hole located at a location along the periphery of slide pin gear 202 corresponding to that point corresponding to the location of the zenith of the rotation of slide pin gear 202, when the zenith is closest to the axle centers of ruffled wheel plates 204, 205.

The holes within slide pin gear 202 are drilled and honed so as to allow each of pins 203, 203a, 203b, etc. which are placed in the holes, to have almost zero clearance, so that any squeeze by pressure of each pair of spring walls 220a, 220b, etc. is applied to squeeze against the respective holes, thus locking each of pins 203, 203a, 203b, etc., in their respective hole, by known technology.

The squeeze pressure is applied by an internal timing gear 223 with teeth 221, 222, etc., facing the outer circumference of slide pin gear 202. The pitch diameter of slide pin gear 202 is pre-set smaller than the pitch diameter of internal timing gear 223. Internal timing gear 223 is set in a bearing surface, that will also fit in between the pair of ruffled wheel plates 204, 205 in the open part of ruffled gear assembly 200.

Slide pin gear 202 is located within the inner area of internal timing gear 223, so that slide pin gear 202 meshes with the pair of teeth 221, 222, etc. of internal timing gear 223 that is closest to the axle center of ruffle gear assembly 200, and are set in that position in the internal timing gear area, so that timing gear 223 only meshes with each of pins 203, 203a, or 203b, etc. that are in the aforesaid meshed teeth area of internal timing gear 223.

Corresponding to that portion of slide pin gear 202 which is actually between a portion of the pair of ruffled wheel plates 204, 205, it is noted that slide pin gear 202 has an area constituting a smaller circle than the area of the circle constituting internal timing gear 223. Furthermore, slide pin gear 202 is placed offset in the bearing surface within the larger circular area of larger timing gear 223.

This offset placement of slide pin gear 202 is to provide relief for releasing each respective pair of teeth 221, 222 of timing gear 223 away from against spring walls 220a, 220b surrounding the holes within each hole pins 203, 203a, 203b, etc., are sequentially squeezed and locked into place momentarily, while each of pins 203, 203a, 203b, etc., are in a position corresponding to the zenith of rotation at the point upon the circumference of slide pin gear 202 which is closest to the axle center of ruffled wheel plates 204, 205.

Each of respective pins 203, 203a, 203b, etc., which are closest to the zenith of their rotating turn and which have been set in ruffled wheel gear plates 204, 205 by its action, is now locked in a position corresponding to the zenith position of the rotation of slide pin gear 202. This locking action unites both each of pins 203, 203a, 203b. etc. and the respective ruffled wheel plate 204 or 205 against pins 203, 203a, 203b etc are forced, making them act as spur gears upon one another. The ratio between the two depends upon the actual portion of the circle surface area of each of ruffled wheel plates 204, 205 that slide pin gear 202 is placed into between ruffled gear plates 204, 205.

In another alternate pin locking embodiment shown in FIGS. 8-10, slide pin gear assembly is made with three spring gear plates, the inner or center plate 302 being wider than both outer plates 302a and 302b. Outer plates 302a, 302b are made of a spring type steel, and outer plates 302a, 302b are separated at the boss center by a separator plate having a smaller diameter than center plate 302 but being thicker in width than center plate 302 so that the periphery edges of outer plates 302a, 302b can be squeezed together.

Three plates 302, 302a, 302b are put together and locked in that position. The holes for each of pins 303, 303a, 303b, etc., are drilled through all three plates 302, 302a, 302b at the peripheral edge of slide pin gear 302, as shown in FIG. 8 at a predetermined distance from the peripheral edge.

Moreover, outer plates 302a, 302b travel within locking ring 320, which locking gear 320 is set in position slightly spaced apart at the outer edge of slide pin gear 302.

Locking ring 320 has an inner radius which is larger than the radius of spring gears 302a, 302b. The setting of locking ring 302 is in a bearing surface, wherein the circle constituting the three spring gear plates 302, 302a, 302b is set offset from the center of the circle constituting locking ring 320, so as to provide relief of outer spring gear plates 302a, 302b from within trough 320a of locking ring 320 at a predetermined position where each of pins 303, 303a, 303b, etc., are located along the circumference of slide pin gear 302 at the zenith of their turning radius, with respect to the axle center of ruffled wheel plates 304, 305.

The inside of locking ring 320 is shaped into a V-shaped trough 320a, so that when outer plates 302a, 302b of the pin spring gear assembly get squeezed into V-shaped trough 320a of locking ring 320, outer plates 302a, 302b come together towards each other, locking the respective pins 303 in that particular area of the squeeze, when each of pins 303, 303a, 303b, etc., are in a position corresponding to the zenith of rotation at a point upon the circumference of slide pin gear 302 closest to the axle center of ruffled wheel plates 304, 305.

Thus, in the alternate locking embodiments shown in FIGS. 7-7A and 8-10, there are provided novel locking features for locking the pins in place, at the point of maximum interface with the ruffled wheel plates.

It is noted that other modifications may be made to the gear assembly of the present invention, without departing from the spirit and scope of the appended claims.

I claim:

1. A type of gear assembly comprising a plurality of facing ruffled wheel plates holding therein a type of slide pin gear, said ruffled wheel plates and said slide pin gear traveling in combination as said ruffled wheel plates and said slide pin gear turn in a positively infinitely variable speed assembly, and further wherein a plurality of slide pins traverse said slide pin gear between said ruffled wheel plates for imparting force upon said ruffled wheel plates.

2. The gear assembly as in claim 1 further comprising said two ruffled wheel plates having a ruffled face upon each wheel plate, each face of each said wheel plate having a plurality of ruffles from a center to a peripheral edge, across the diameter of said wheel and from said center to said peripheral edge, each said ruffle having a surface having valleys with a depth of each valley being equal in dimension to a height of a corresponding crest of a plurality of crests of said ruffles, each said ruffles forming a smooth blending wave into each another of said ruffles.

3. The gear assembly as in claim 2, wherein both said facing wheel plates of said ruffled wheel are a mirror image of one another, said ruffled wheel plates facing each other being made so that the crest of one side of said ruffles of said wheel plate faces the valley of the other ruffles of said corresponding wheel plate.

4. The gear assembly as in claim 3, wherein said ruffles are set at a distance from each other, just enough as to allow the width of the slide pin gear, without the slide pin, to pass through the crests of both of the ruffle plates, and so are set at that position on a shaft.

5. The gear assembly as in claim 4, wherein said slide pins slide in the slide holes of said slide pin gear, said pins being sandwiched between said valleys and said crests of said ruffled plates facing each other, said pins being longer then the width of said gear.

6. The gear assembly as in claim 5, comprising said slide pin gear having equally spaced holes close to said outer peripheral edge enough as to support a hole, said hole allowing each of said slide pin to go from side to side traversely within said slide pin gear.

7. The gear assembly as in claim 6, wherein said slide pins are rounded at the ends thereof and the lengths of the rounded slide pins are equal to the distance between the crest and valley of the ruffle plates that face each other.

8. The gear assembly as in claim 7, wherein a different section of said rounded ends of the slide pin comes in contact with the surface of the valley and crest of the ruffle plate.

9. The gear assembly as in claim 8 wherein said pins that are in the straightest line with axle centers of the ruffle gear and mating slide pin gear that are in combination in this assembly and said pins are at their zenith of their turn radius, and about this point is where said pins offer their most support to one another, to blend into the force of their turning action.

10. The gear assembly as in claim 9 wherein said incoming pins and said outgoing will move from side to side in their slide area that said pins are in because of the sideward thrust that is imposed on such said pin by the sine of the angle of the crest of said ruffled plate pushing each said pin into the valley of its opposite plate, the same occurring as said pins leave, said pins only coming to their respective locked positions in said slide pin gear as said pins reach the zenith of their radius of their turn, as they are trapped in the valley of the ruffle by the crest of the other, and in this position they are in their mode turning together.

11. The gear assembly as in claim 10 wherein said slide pin gear can be put in any radius of the ruffled wheel plates for changing the rotational speed of either of the slide pin gear or of the ruffled gear, whichever is the drive or driven.

12. The gear assembly as in claim 11, further comprising:

a means to lock each of said pins in said pin gear, as each of said pins in said pin gear are placed into a position by the action of said ruffled gear plates upon said pins at a position upon the circumference of said slide pin gear corresponding to the zenith of rotation of said slide pin gear closest to the axle centers of said ruffled wheel plates, means comprising:

said pin gear having an arrangement of holes around the peripheral edge;

a first slit extending from an edge of said slide pin gear to the holes;

a plurality of further slits extending, as second and third slits on both sides of each of said holes, to a predetermined depth;

said slits extending between a pair of compressible spring walls, said spring walls surrounding each pin;

said spring walls being compressible against each other, said spring walls urging and tightening each said pin within a respective hole located at a predetermined position located along the periphery of said slide pin gear corresponding to the zenith of the rotation of said slide pin gear when the zenith is closest to the axle centers of said ruffled wheel plates;

each of said holes being drilled and honed as to allow each of said pins placed in said holes almost to zero clearance, and, said spring walls urging against each of said pins by pressure for momentarily locking each said pin in each respective hole located at said predetermined position.

13. The gear assembly as in claim 12 further comprising:

an internal timing gear with teeth, said timing gear facing the outer circumference of said slide pin gear, the pitch diameter of said pin gear being preset smaller than the pitch diameter of said timing gear;

said internal timing gear being set to rotate in a bearing housing that is sandwiched by the ruffled gear;

said slide pin gear being located and rotatable within an inner area of said internal timing gear;

said slide pin gear engagable with a pair of teeth of said internal timing gear, which said teeth being closest to the axle center of said ruffle gear plates;

said timing gear only engagable with each respective pin that is within each of said respective teeth located at a predetermined position corresponding to that portion of said slide pin gear which is between a portion of the pair of ruffled wheel plates;

said slide pin gear having a surface area being a smaller circle than the circle constituting the surface area of said timing gear;

said slide pin gear being offset in its bearing surface within the larger circular area of said larger timing gear, for providing relief for releasing the teeth of said timing gear from against said spring walls surrounding said holes within which said pins are squeezed and locked into place momentarily, while said pins are in a predetermined position corresponding to the zenith of rotation at the point upon the circumference of the slide pin gear closest to the axle center of said ruffled wheel plates.

14. The gear assembly as in claim 11 further comprising:

said slide pin gear comprising three spring gear plates, including:

an inner plate being wider than each of a pair of outer plates;

said outer plates being made of a spring type steel;

said outer plates being separated at the boss center by a separator plate having a smaller diameter than said inner plate but being thicker in width than said center plate, the periphery of said outer plates being sqeezable together;

said three plates being put together and lockable in said predetermined position;

said plates being drilled and honed with holes through all three plates at the peripheral edge at predetermined distances from each of the peripheral edges of said plates;

said gear assembly further comprising an external locking ring being positionable slightly spaced apart at an outer edge of said slide pin gear;

said locking ring having an inner radius which is larger than the radius of said spring gear, the setting of said external locking ring is set to rotate in a housing that is sandwiched between the ruffled gear plates wherein a circle constituting said two spring locking plates is set offset from a center of the circle constituting said external locking ring, and, said locking ring having a trough to provide relief of said outer spring gear plates from within said trough of said locking ring at said predetermined position where each of said pins are in the zenith of their turning radius with respect to the axle center of said ruffled wheel plates.

15. The locking ring as in claim 14 where the inside of said locking ring is shaped into a V-form trough for squeezing said outer plates of said spring gear plates into said V-shaped trough of said external locking ring, said outer plates merging together, locking each of said pins in at said predetermined position within a corresponding part of said slide pin gear.

16. A type of speed transmission assembly gear comprising:

a plurality of slide pins;

each said slide pin sequentially traversing a respective hole of a plurality of holes located along a periphery of a rotatable slide pin gear;

a pair of facing rotatable ruffled wheel plates, said plates sandwiching therebetween said rotatable slide pin gear, said slide pin gear travelling in combination as said wheel plates turn in a positive infinitely variable speed assembly;

said two ruffled wheel plates each having a face upon each wheel plate, each said face having a plurality of ruffles upon a ruffled surface from the center to peripheral edge, said ruffled surface being flat across a diameter of said ruffled wheel plate, and from the center to the peripheral edge, the depth of each valley of each said ruffle being equal as the crest of each of said ruffles, said plurality of ruffles forming a smooth blending wave of each ruffle into each other ruffle;

both said faces of said ruffled wheel plates of said gear assembly being a mirror image of one another;

said ruffles facing each other each having crests and valleys, said crests and valleys being made so that the crest of one ruffle of one said ruffled plate faces a corresponding valley of said other said ruffled plate;

said ruffled plates being set spaced apart in a facing position from each other at a predetermined distance as to allow the width of said slide pin gear, without each of said slide pins, to pass through the crests of both of said ruffle plates, and said ruffled plates being set at said facing position on a rotatable shaft;

said slide pins movable transversely in said holes of said slide pin gear, said pins being moveable between said valleys and said crests of said facing ruffled plates that are facing each other, said pins having a longitudinal length longer then the width of said slide pin gear;

said slide pin gear having said plurality of equally spaced holes close to outer peripheral edge, said holes allowing said slide pins to traverse from side to side within said slide pin gear;

the length of said pins being equal to the distance between each said crest and each said valley of said ruffled plates facing each other;

said pins each having a convex spherical end communicating with each of said valleys and said crests of each of said ruffled wheels plates;

said pins being lockable in each of said valleys of one ruffled wheel plate by each of said crests of said oppositely facing ruffled wheel plate;

each of said pins movable incoming and movable outgoing against each of said ruffled plates;

said incoming pins and said outgoing pins movable from side to side in said slide pin gear by means of the sideward thrust that is imposed on said pins by the sine of the angle of said crests of each of said ruffled wheel plates pushing said pins into each said valley of said opposite ruffled wheel plates, said pins coming to a locked position in said slide pin gear as said pins reach the zenith of their radius of their turning, said pins being holdable within said respective valleys of said ruffled wheel plates by said respective crests of said other, oppositely facing ruffled wheel plate, such that in this position said pins being turnable together, and said slide pin gear being locatable at a position corresponding to any radius of said ruffled wheel plates for changing the rotating ratio of said slide pin gear to said ruffled wheel plates, whichever is the drive or driven.

* * * * *